United States Patent
Coulaud et al.

(10) Patent No.: US 11,311,971 B2
(45) Date of Patent: Apr. 26, 2022

(54) OPTICAL DEVICE FOR LASER TREATMENT OF THE INTERNAL SURFACES OF A COVERING PART

(71) Applicant: SAFRAN, Paris (FR)

(72) Inventors: Magali Melanie Coulaud, Moissy-Cramayel (FR); Nicolas Cuvillier, Moissy-Cramayel (FR); Mathieu Loic Ducousso, Moissy-Cramayel (FR)

(73) Assignee: SAFRAN, Paris (FR)

( * ) Notice: Subject to any disclaimer, the term of this patent is extended or adjusted under 35 U.S.C. 154(b) by 345 days.

(21) Appl. No.: 16/478,361

(22) PCT Filed: Jan. 16, 2018

(86) PCT No.: PCT/FR2018/050094
§ 371 (c)(1),
(2) Date: Jul. 16, 2019

(87) PCT Pub. No.: WO2018/134508
PCT Pub. Date: Jul. 26, 2018

(65) Prior Publication Data
US 2019/0366481 A1    Dec. 5, 2019

(30) Foreign Application Priority Data
Jan. 18, 2017  (FR) ...................... 17 50362

(51) Int. Cl.
*B23K 26/352* (2014.01)
*B23K 26/142* (2014.01)
(Continued)

(52) U.S. Cl.
CPC ........ *B23K 26/352* (2015.10); *B23K 26/0643* (2013.01); *B23K 26/0648* (2013.01);
(Continued)

(58) Field of Classification Search
CPC ........ G02B 5/08; G02B 5/09; G02B 27/0977; G02B 27/0966; G02B 27/143;
(Continued)

(56) References Cited

U.S. PATENT DOCUMENTS 4,724,297 A * 2/1988 Nielsen ................ B23K 26/123
219/121.67
5,227,606 A * 7/1993 Weeks ................ B23K 26/123
219/121.67
(Continued)

FOREIGN PATENT DOCUMENTS

DE  102014207263 A1 * 10/2014 ........... B23K 26/389
FR  2 970 668 A1  7/2012
(Continued)

OTHER PUBLICATIONS

Machine translation of Japan Patent document No. 2015-071168-A, Aug. 2021 (Year: 2021).*
(Continued)

*Primary Examiner* — Geoffrey S Evans
(74) *Attorney, Agent, or Firm* — Oblon, McClelland, Maier & Neustadt, L.L.P.

(57) ABSTRACT

An optical device that is intended for laser treatment of internal surfaces of a covering part of the leading-edge type, including a collimator that is intended to be connected to a laser source via an optical fibre to produce a laser beam having a collimated and flat spatial pulse profile, a cylindrical lens that is configured to focus the laser beam along a spatial line that is transverse to the propagation of the laser beam thus forming a line-laser-beam, a reflecting optical component that is configured to be able to be introduced into the interior of the covering part and to uniformly reflect the line-laser-beam onto at least one internal surface of the
(Continued)

covering part and in directions of incidence that are almost normal to at least one internal surface.

8 Claims, 4 Drawing Sheets

(51) Int. Cl.
*B23K 26/06* (2014.01)
*B23K 26/067* (2006.01)
*B23K 26/073* (2006.01)
*B23K 26/08* (2014.01)
*B23K 26/14* (2014.01)
*G02B 27/09* (2006.01)
*G02B 27/14* (2006.01)
*B23K 101/00* (2006.01)

(52) U.S. Cl.
CPC ...... *B23K 26/0652* (2013.01); *B23K 26/0676* (2013.01); *B23K 26/0738* (2013.01); *B23K 26/0876* (2013.01); *B23K 26/14* (2013.01); *B23K 26/142* (2015.10); *G02B 27/0966* (2013.01); *G02B 27/143* (2013.01); *B23K 2101/001* (2018.08)

(58) Field of Classification Search
CPC ............ B23K 26/0643; B23K 26/0676; B23K 26/0738; B23K 26/352; B23K 26/142; B23K 26/0648; B23K 26/0652; B23K 26/14; B32K 26/0876

See application file for complete search history.

(56) References Cited

U.S. PATENT DOCUMENTS

| | | | |
|---|---|---|---|
| 5,533,146 A * | 7/1996 | Iwai | B23K 9/0956 |
| | | | 219/121.63 |
| 6,169,630 B1 | 1/2001 | Shirasaki et al. | |
| 2013/0294920 A1 | 11/2013 | Klein et al. | |
| 2016/0151862 A1* | 6/2016 | Harten | B23K 26/06 |
| | | | 219/121.85 |
| 2018/0177386 A1* | 6/2018 | Wortelboer | G02B 27/143 |

FOREIGN PATENT DOCUMENTS

| | | | |
|---|---|---|---|
| JP | 2009-271206 A | | 11/2009 |
| JP | 2009-294236 A | | 12/2009 |
| JP | 2015071168 A | * | 4/2015 |
| WO | WO 2016/20271 A1 | | 12/2016 |

OTHER PUBLICATIONS

International Search Report dated Apr. 16, 2018 in PCT/FR2018/050094 filed Jan. 16, 2018.

* cited by examiner

OPTICAL DEVICE FOR LASER TREATMENT OF THE INTERNAL SURFACES OF A COVERING PART

TECHNICAL FIELD

The present invention relates to the field of laser treatment of internal surfaces of a covering part, and, more specifically, the treatment of a leading edge-type part of an aircraft engine blade.

PRIOR ART

The blades of an aircraft engine must resist high mechanical stresses while satisfying strict weight and bulk requirements. Thus, to reduce the weight of the blades, composite materials are being used with increasing frequency. However, the fan blades FAN must also resist impacts by foreign bodies. It has thus been envisaged to consolidate the leading edge of the blades using a metal reinforcement part, also called the leading edge.

Each fan blade is thus made of a 3D woven composite material part to which a leading edge made of metal, for example a titanium alloy, is bonded. The bonding used is structural in the sense that it is used for the mechanical strength of the assembly while ensuring load bearing in service. Indeed, the bonding must withstand a possible impact by a foreign body. To produce this type of bonding, the leading edge must first undergo a surface cleaning or treatment specific to the bonding. These preparatory operations are currently performed by aqueous means by immersing the leading edge into different chemical solutions. However, this method is time-consuming, costly and requires very strict compliance with chemical pollution control standards.

Moreover, it should be noted that this type of metal part cannot be treated by laser. Indeed, for the laser treatment to be effective, it is necessary for the laser beam to be directed onto the surface to be treated according to a direction of quasi-normal incidence. However, a leading edge has a concave, deep and narrow shape, which does not allow for a laser surface treatment. As an example, a leading edge has a depth of several centimetres or even around ten centimetres and an opening of only several millimetres. Thus, the internal surfaces of the leading edge cannot be targeted by a laser beam from the outside and according to a direction normal to said surfaces.

Thus, the present invention is intended to propose an optical device that overcomes the aforementioned disadvantages, allowing for a precise, quick and non-polluting laser treatment.

DESCRIPTION OF THE INVENTION

The invention relates to an optical device intended for the laser treatment of the internal surfaces of a covering part of the leading edge type, comprising:
a collimator intended to be connected to a laser source via an optical fibre in order to produce a laser beam having a collimated and flat spatial pulse profile,
a cylindrical lens configured to focus said laser beam along a spatial line that is transverse to the propagation of said laser beam, thus forming a line laser beam,
an optical reflection component configured so as to be capable of being inserted into said covering part and to uniformly reflect said line laser beam onto at least one internal surface of said covering part and according to local directions of quasi-normal incidence to said at least one internal surface.

Thus, the device makes it possible to generate optimal energy for the treatment of the internal surface of a part that may have a complex, narrow and deep geometric configuration having internal surfaces that are not directly accessible by a laser beam directed from outside the covering part and especially not with a near-normal incidence.

Advantageously, the optical component has a dihedron with at least one oblique surface equipped with a stepped-mirror assembly, each mirror being configured so as to reflect a fraction of said line laser beam according to a direction quasi-normal to said at least one internal surface.

This configuration of a stepped mirror assembly on an inclined surface makes it possible to minimize the bulk of the optical reflection component thus enabling it to be easily inserted into a deep and narrow covering part. This cannot be performed with a single inclined mirror, which would be very large, or with a controlled mirror, which would be very thick for reaching the bottom of the covering part. In addition, the different mirrors may have variable inclinations adapted to the internal shape of the covering part, thus making it possible to locally adapt the focusing of the laser beam so that it is directed with a near-normal incidence onto each area of the internal surface of the covering part.

Advantageously, the dihedron has two oblique surfaces each equipped with a stepped mirror assembly.

This makes it possible to uniformly reflect the laser beam simultaneously onto two internal surfaces of the covering part.

For a covering part having a predetermined depth and a predetermined opening, the optical component advantageously has a length approximately equal to the predetermined depth of said covering part and a maximum height inferior to the predetermined opening of said part.

Thus, the laser beam may reach the internal surface of the covering part over the entire depth thereof.

Advantageously, according to a first embodiment, the stepped mirrors are mirrors with flat surfaces inclined with respect to the corresponding oblique surface of the dihedron. The mirrors thus combine the inclination of the oblique surface and their own inclinations, considerably reducing the bulk of the optical component.

According to a second embodiment, the mirrors are arranged on the corresponding oblique surface of the optical component according to constant or variable inclinations and have identical or different surfaces selected from the following surfaces: flat, concave and convex.

This makes it possible to optimize the incidence of the laser beam on the internal surface according to the shape of the covering part.

Advantageously, the optical device includes a frame configured to support the optical reflection component, the collimator and the cylindrical lens.

Thus, the relative movement between the optical device and the covering part may be facilitated.

Advantageously, the frame includes a ball making it possible to further facilitate the relative mobility between the optical device and the covering part.

The invention also relates to a system for laser treatment of internal surfaces of a leading edge-type covering part, comprising the optical device according to any one of the above-mentioned features, as well as a laser source and an optical fibre connecting said optical device to the laser source.

Advantageously, the system also includes an air flow generator intended to generate an air flow inside the covering part during the treatment of the interior surfaces by the optical device.

This prevents the vapours resulting from the surface treatment from settling on the optical device.

BRIEF DESCRIPTION OF THE DRAWINGS

Other features and advantages of the invention will appear upon reading of the preferred embodiments of the invention, in reference to the appended figures, wherein.

DETAILED DESCRIPTION OF SPECIFIC EMBODIMENTS

Figure 1:
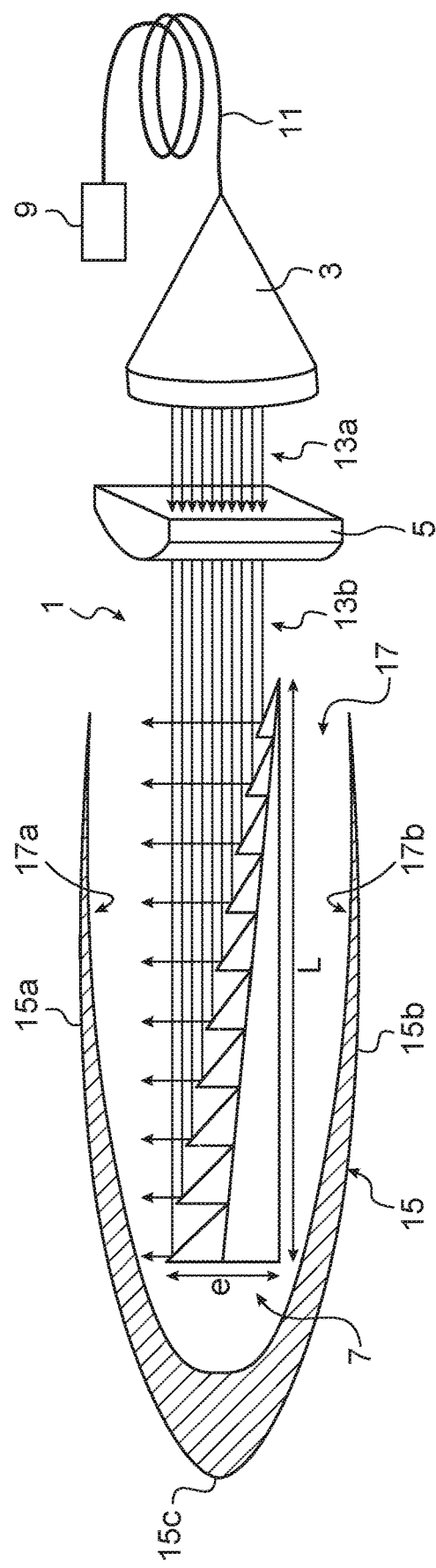
FIG. 1 schematically shows an optical device intended for the laser treatment of internal surfaces of a leading edge-type covering part, according to an embodiment of the invention.

According to the invention, FIG. 1 schematically shows an optical device intended for the laser treatment of internal surfaces of a leading edge-type covering part, according to an embodiment of the invention.

The optical device 1 comprises an a focal collector or collimator 3, a cylindrical lens 5 and an optical reflection component. This device 1 is intended to be connected to a laser energy source 9, for example on the order of 100 Watt.

In fact, the collimator 3 is suitable for being connected to the laser source 9 via an optical fibre 11 in order to produce a laser beam 13a having a collimated and flat spatial pulse profile. More specifically, the collimator 3 and/or the optical fibre 11 are configured to impart on the laser beam a flat spatial profile allowing for a homogeneous spatial distribution of the energy of the beam. In addition, the collimator 3 is suitable for spatially expanding the spot of the laser beam.

At the output of the collimator 3, the cylindrical lens 5 is configured to focus the collimated laser beam 13a along a spatial line transverse to the propagation of the laser beam. This focusing forms a laser beam 13b of which the "spot" is in the form of a "dashe" (or a "line"). Thus, below, the beam at the output of the cylindrical lens 5 is called a "line laser beam" 13b.

The optical reflection component 7 is dimensionally configured so as to be capable of being inserted into said covering part 15.

In particular, a leading edge-type covering part 15 consists of a first lip 15a and a second lip 15b connected by a longitudinal edge 15c having a length of several centimetres. The leading edge 15 thus defines a cavity 17 formed by the internal surfaces 17a and 17b of the first and second lips 15a and 15b, respectively. The cavity 17 has a depth of several centimetres or even around ten centimetres, while the opening or the minimal gap between the internal surfaces 17a, 17b of the two lips 15a, 15b is only approximately several millimetres. Thus, the optical reflection component 7 is configured so as to have a length "L" inferior to the predetermined depth of the leading edge 15 and a maximum thickness or height "e" inferior to the minimum predetermined gap between the internal surfaces 17a, 17b of the two lips 15a, 15b. Thus, in the example above, the optical reflection component 7 has a length L of less than around ten centimetres and a maximum height e of less than several millimetres.

In addition, the optical reflection component 7 is configured so as to deflect the direction of the line laser beam 13b according to a quasi-right angle. More specifically, the optical reflection component 7 is configured so as to uniformly reflect the line laser beam 13b onto at least one internal surface 17a of the covering part 15 and according to directions of quasi-normal incidence to the internal surface (s). The term quasi-normal refers to an angle between the laser beam and the normal to the surface that is close to zero, which can be, for example more or less 15°.

Advantageously, the optical reflection component 7 has a dihedron 71 with at least one oblique surface 71a equipped with a stepped mirror assembly 73, which is small, making it possible to minimize the bulk of the optical reflection component 7.

In addition, the length L of the optical reflection component 7 is advantageously approximately equal to the predetermined depth of the covering part 15, thus enabling the line laser beam 13b to spray the entire internal surface of the covering part 15 over the entire depth thereof.

Figure 2A:
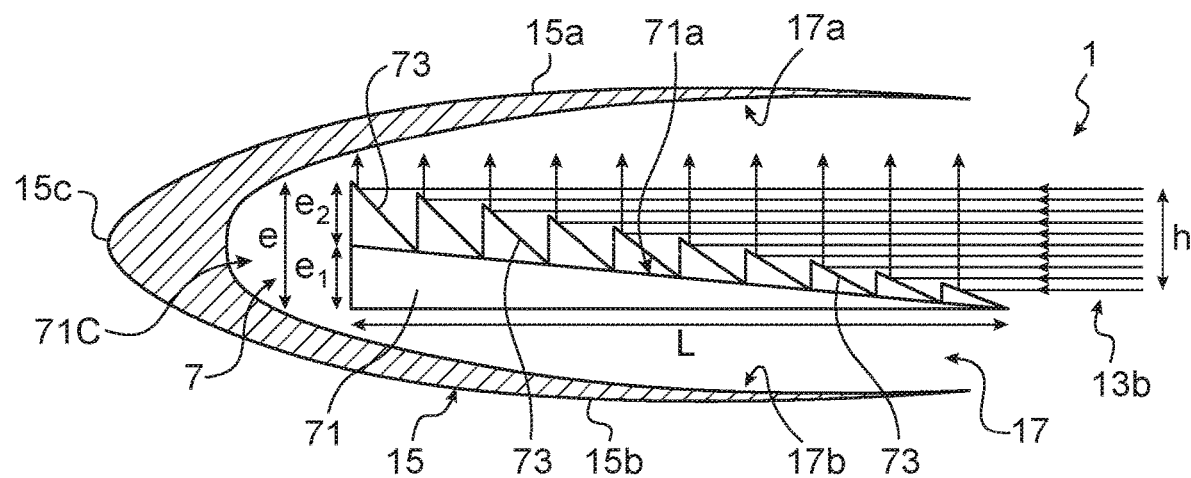
FIG. 2A schematically shows an optical reflection component, according to a first preferred embodiment of the invention.

FIG. 2A schematically shows an optical reflection component, according to a first embodiment of the invention.

According to this first embodiment, the optical reflection component 7 has a dihedron 71 with a single oblique surface 71a equipped with a stepped mirror assembly 73. Each mirror 73 is configured to reflect a fraction of the line laser beam 13b according to a quasi-right angle of reflection. Thus, each small mirror 73 is suitable for reflecting the corresponding fraction of the line laser beam 13b according to a direction quasi-normal to the internal surface 17a of the covering part 15.

The stepped mirrors 73 are, for example, flat mirrors inclined with respect to the oblique surface 71a of the dihedron 71. They thus combine the inclination of the oblique surface and their own inclinations.

It should be noted that the optical reflection component 7 is intended to be inserted into the covering part 15 so that the oblique surface thereof is arranged opposite an internal surface 17a of the covering part 15 and the side 17c thereof opposite the dihedral angle is arranged at the bottom of the cavity 17. Thus, each mirror 73 receives a corresponding slice of the line laser beam 13b.

For example, for a covering part 15 having a depth of 4 cm and a gap between the two internal surfaces 17a, 17b greater than 4 mm, it is appropriate to use an optical reflection component 7 having a maximum thickness e of 4 mm. More specifically, the optical reflection component 7 may consist of a dihedron 71 having a dihedral angle of around 3°, a base 71b having a length L of 4 cm and a side 71c opposite the dihedral angle having a height e1 of around 2 mm. In addition, each mirror 73 may have a maximum height e2 of 2 mm with respect to the oblique surface 71a so that the maximum height e of the optical reflection component 7 is equal to 4 mm (e=e1+e2). In addition, each mirror 73 may have an inclination of around 45° with respect to the base 71b of the dihedron 71, which forms an angle of around 42° with respect to the oblique surface 71a. In this case, the oblique surface 71a of the dihedron 71 will be covered with around twenty small inclined mirrors 73.

Advantageously, the height h of the line formed by the line laser beam 13b is about equal to the maximum height e of the optical reflection component 7. Thus, each mirror 73 receives almost the same proportion of light intensity from the line laser beam 13b, allowing for a homogeneous diffusion and a uniform distribution of the laser onto the internal surface 17a, 17b to be treated.

According to the example of FIG. 2A, the mirrors 73 have identical flat surfaces of the same dimensions and are arranged on the oblique surface 71a of the dihedron 71 according to constant angles of inclination.

It should be noted that other configurations may be envisaged. Indeed, the mirrors 73 may have different surfaces and different orientations, so that locally the laser beam 13b reflected by a mirror 73 is, as much as possible, normal to the internal surface 17a, 17b of the covering part 15, which may have a particular shape. Similarly, the mirrors 73 are not necessarily flat and may be converging or diverging mirrors defining a configuration suitable for an optimal treatment of the part 15 according to the local shape thereof.

Thus, the mirrors 73 may be arranged on the oblique surface 71a of the dihedron 71 according to variable inclinations according to interior shape of the covering part 15 and may have identical or different surfaces selected from the following surfaces: flat, concave and convex.

Once a first internal surface 17a of the covering part 15 has been treated by the optical device 1, the oblique face of the optical reflection component may be placed opposite the other internal surface 17b of the covering part 15 in order to treat it. Alternatively, the covering part 15 may itself be positioned in the opposite direction in order to treat the second surface 17b thereof. It should be noted that the bottom 17c of the cavity 17 may be treated directly by the laser beam from the outside without using the optical reflection component 7.

Figure 2B:
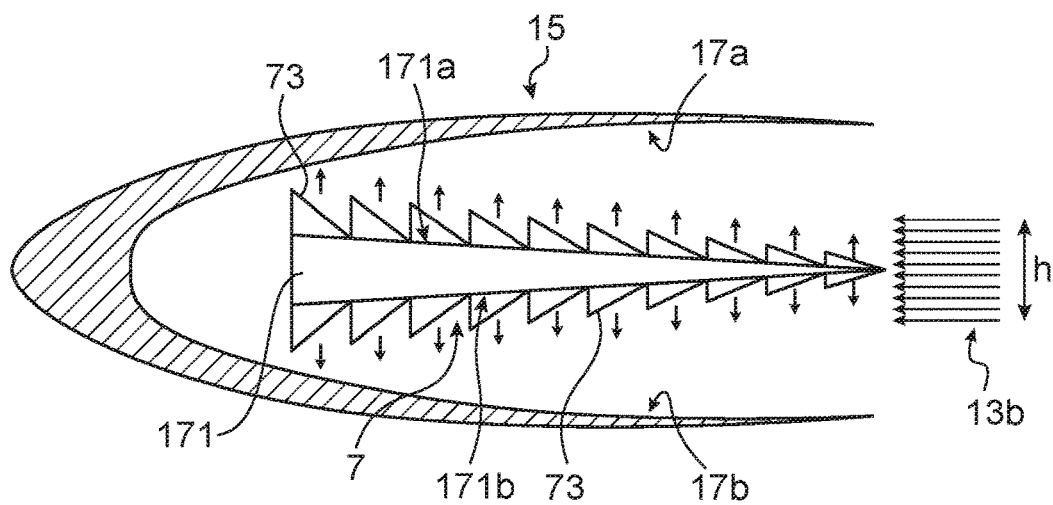
FIG. 2B schematically shows an optical reflection component, according to a second preferred embodiment of the invention.

FIG. 2B schematically shows an optical reflection component, according to a second embodiment of the invention.

According to this second embodiment, the dihedron 171 has two oblique surfaces 171a and 171b each equipped with a stepped mirror assembly 73.

The shape and inclination of the mirrors 73 may be similar to those of the example of FIG. 2A. Thus, each stepped mirror assembly may comprise mirrors 73 with flat surfaces inclined with respect to the corresponding oblique surface 171a, 171b of the dihedron 171.

Alternatively, the mirrors 73 may have identical or different surfaces with flat, concave or convex shapes and may be arranged on the oblique surfaces 171a, 171b of the dihedron 171 according to constant or variable inclinations.

It should be noted that, according to the second embodiment, the light intensity of the line laser beam 13b is reflected simultaneously from the two oblique surfaces of the optical reflection component 7. This makes it possible to treat the internal surfaces 17a and 17b of the covering part 15 in a single passage, thus increasing the speed of the treatment. However, the energy of the laser beam must be doubled in order to have the same efficacy of the treatment as that of the first embodiment of FIG. 2A.

Figure 3A:
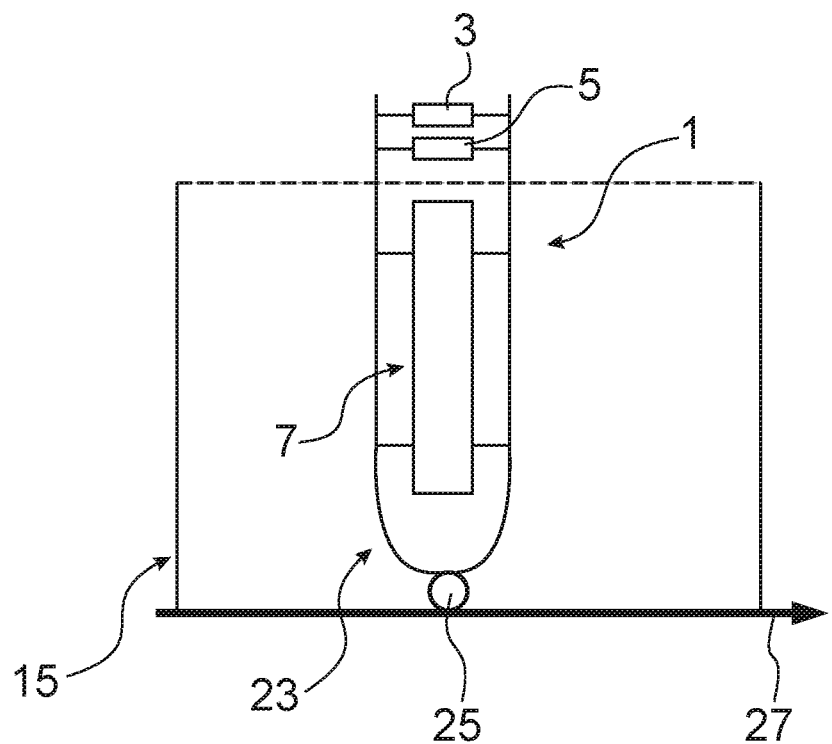
FIGS. 3A and 3B schematically show an optical device including a frame, according to a preferred embodiment of the invention.
Figure 3B:
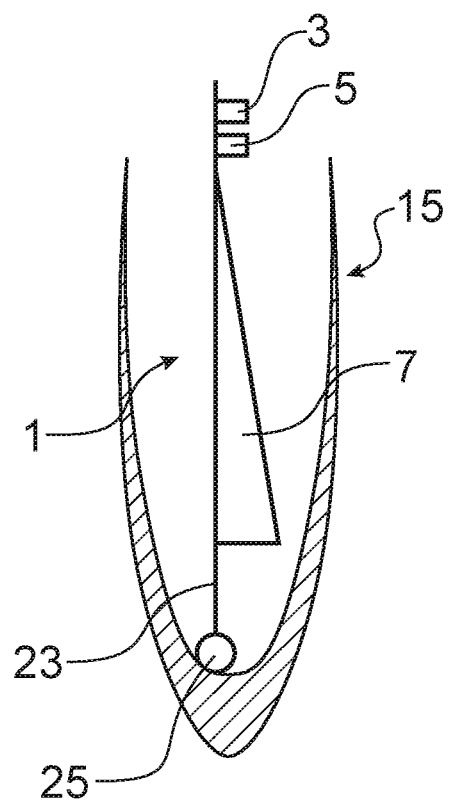

FIGS. 3A and 3B schematically show an optical device including a frame, according to a preferred embodiment of the invention. FIG. 3A is a front view while FIG. 3B is a profile view of the optical device.

In fact, the optical device 1 comprises a frame 23, for example, in the form of a U-shape, configured for assembling and supporting the collimator 3, the cylindrical lens 5 as well as the optical reflection component 7 according to any one of the embodiments of FIGS. 2A and 2B.

Advantageously, the frame 23 includes a ball 25 making it possible to roll the device 1 to the bottom 17c of the groove of a leading edge-type part 15. Indeed, the bottom of the leading edge 15 defines a guide facilitating the rolling of the ball 25 of the optical device 1 in the direction of the axis 27 of the groove in order to treat the internal surfaces 17a, 17b over the entire widths thereof.

Figure 4:
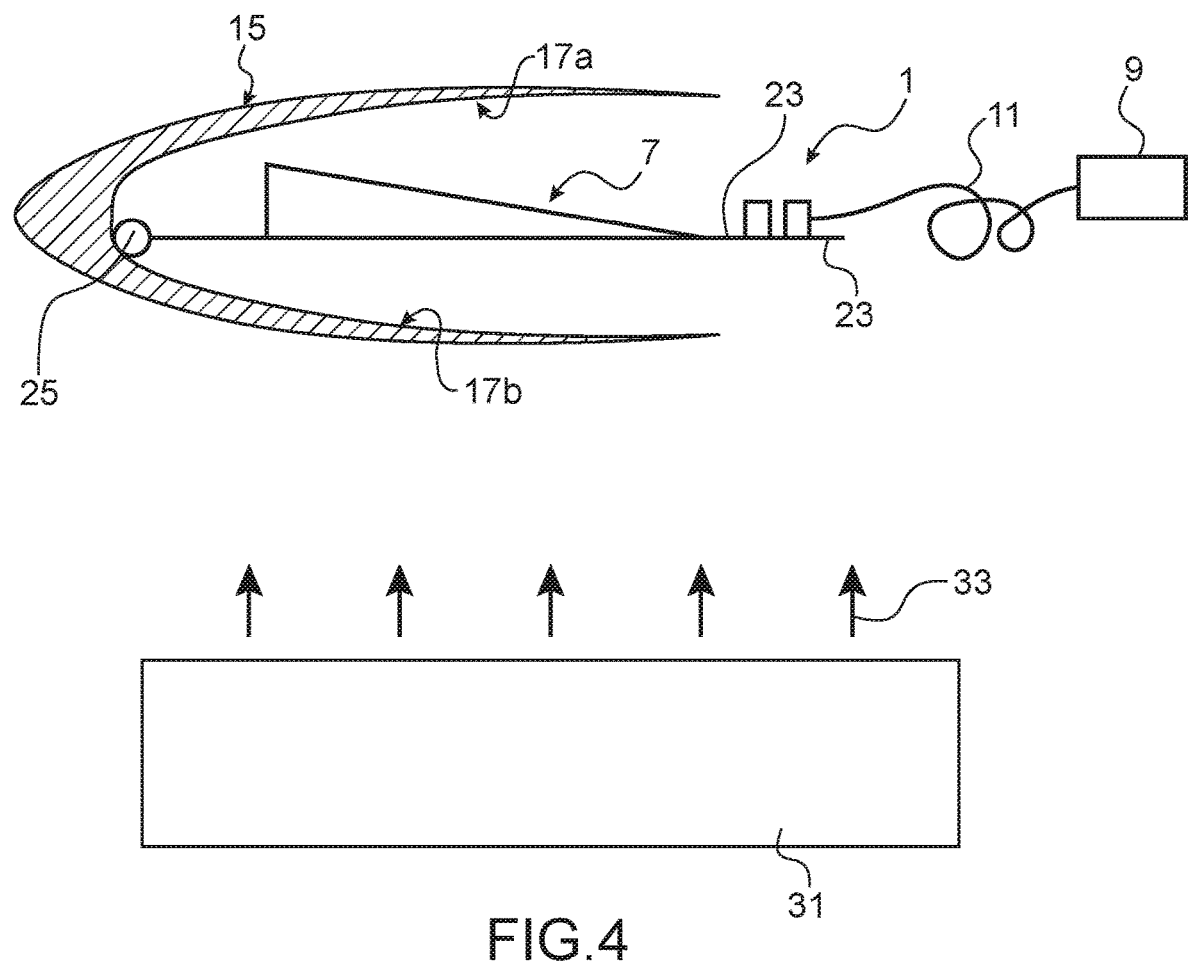
FIG. 4 schematically shows a system for laser treatment of internal surfaces of a leading edge-type covering part, according to a preferred embodiment of the invention.

FIG. 4 schematically shows a system for laser treatment of the internal surfaces of a leading edge-type covering part, according to a preferred embodiment of the invention.

The treatment system includes a laser source 9 and an optical fibre 11 connecting the laser source 9 to the optical device 1 according to any one of the above embodiments.

Advantageously, the treatment system also includes an air flow generator 31 intended to generate an air flow 33 inside the covering part 15 during the treatment of the internal surfaces 17a, 17b by the optical device 1.

In fact, during the treatment of the internal surfaces 17a, 17b, the laser-material interaction may cause the ejection of vapours, which the air flow 33 prevents from settling onto the various elements of the optical device 1.

Advantageously, the generator 31 is configured so as to generate a laminar air flow 33, the flow of which is dependent upon the amount of vapour generated and the distance between the laser-material interaction area and the optical reflection component 7, thus making it possible to protect the optical device 1 from possible deterioration.

The invention claimed is:

1. An optical device suitable for laser treatment of internal surfaces of a leading edge covering part of an aircraft engine blade, comprising:
    a laser source,
    a collimator connected to the laser source via an optical fiber in order to produce a laser beam having a collimated and flat spatial pulse profile;
    a cylindrical lens configured to focus said laser beam along a spatial line that is transverse to a propagation of said laser beam, thus forming a line laser beam; and
    an optical reflection component configured so as to be capable of being inserted into said covering part and to uniformly reflect said line laser beam onto at least one internal surface of said covering part, the optical reflection component having a dihedron with at least one oblique surface equipped with a stepped-mirror assembly, each mirror being configured so as to reflect a fraction of said line laser beam according to a direction quasi-normal to said at least one internal surface.

2. The device according to claim 1, wherein the dihedron has two oblique surfaces each equipped with a stepped mirror assembly.

3. The device according to claim 1, wherein said covering part has a predetermined depth and a predetermined opening and wherein the optical reflection component has a length of less than or equal to ten centimeters and a maximum height of less than or equal to four millimeters.

4. The device according to claim 1, wherein the stepped mirrors are mirrors with flat surfaces inclined with respect to the at least one oblique surface of the dihedron.

5. The device according to claim 1, wherein the mirrors are arranged on the at least one oblique surface of the optical reflection component according to constant or variable inclinations and have identical or different surfaces selected from surfaces that are flat, concave, or convex.

6. The device according to claim 1, further comprising a frame configured to support the optical reflection component, the collimator and the cylindrical lens.

7. The device according to claim 6, wherein the frame includes a ball.

8. The device according to claim 1, further comprising an air flow generator intended to generate an air flow inside the covering part during the laser treatment of the at least one interior surface of the covering part by the optical device.

* * * * *